June 13, 1967 F. M. WILLIAMSON 3,324,559
COMPOUND ANGLE COMPUTER

Filed July 26, 1965 2 Sheets-Sheet 1

INVENTOR.
FLOYD M. WILLIAMSON
BY Whittemore,
Hulbert & Belknap
ATTORNEYS

June 13, 1967  F. M. WILLIAMSON  3,324,559
COMPOUND ANGLE COMPUTER
Filed July 26, 1965  2 Sheets-Sheet 2

INVENTOR.
FLOYD M. WILLIAMSON
BY *Whittemore,*
*Hulbert & Belknap*
ATTORNEYS

United States Patent Office 3,324,559
Patented June 13, 1967

3,324,559
COMPOUND ANGLE COMPUTER
Floyd M. Williamson, Detroit, Mich., assignor to
William J. Herrmann, Birmingham, Mich.
Filed July 26, 1965, Ser. No. 474,918
14 Claims. (Cl. 33—97)

This application is a continuation-in-part of application Ser. No. 371,499, filed June 1, 1964, now abandoned.

The invention relates to a device for computing compound angles and refers more specifically to a mechanical computer for compounding angles for machining operations or the like without the aid of mathematical tables or computations.

In shop work it is often necessary to provide a hole or a surface which is tilted obliquely to both the horizontal and vertical planes of a workpiece. The angle of the hole or surface is commonly shown on working drawings by the projection of, for example, the hole on the top, front and side views of the workpiece. Working drawings may have all three views or may be provided with the front view and top view or with the front view and side view. Since the angles shown on the working drawings are only the projection of the angle of the hole, the true angle of the hole must be computed before the workpiece can be positioned for machining which is accomplished on conventional equipment in predetermined planes parallel to the vertical and horizontal planes of the workpiece.

The angle to be compounded to provide the correct positioning of the workpiece for machining on conventional equipement will depend on the method of mounting the workpiece to be machined. Thus, a workpiece in which it is desired to drill a hole extending at a compound angle therein may be mounted by either the rotation and tilt method or the double tilt method. When the top and front views of a workpiece are given, the workpiece can most easily be positioned by using the rotation and tilt method in which the workpiece is first rotated to the angle shown in the top view and then tilted to the corrected or compounded angle shown in the front view. When the front view and side view of the workpiece is given, it can be most easily positioned for machining the hole by using the double tilt method. In the double tilt method the workpiece is mounted on a magnasine or similar fixture having two plates that tilt in planes perpendicular to each other. The lower plate is then tilted to the angle shown in the side view and the second plate is tipped to the corrected or compounded angle shown in the front view.

In the past the compound angles have been determined mathematically through the use of mathematical tables and computations. Such determination of compound angles is undesirable since it requires a facility in mathematics which is often not found in shop personnel. In addition, even when the shop personnel is familiar with the required mathematical principles, mathematical computation of compound angles is a tedious procedure which is wasteful of the time and conducive to errors.

It is therefore one of the objects of the present invention to provide an improved device for compounding angles.

Another object is to provide a mechanical device for compounding angles without mathematical tables or computations.

Another object is to provide a computer for directly solving for an unknown angle of one right triangle when one angle of two adjacent right triangles each of which have one side in common with the one right triangle and the other side in common with each other are known.

Another object is to provide a mechanical computer including means for setting up a first and second right triangle having a common side set equal to unity and other sides in common with a third right triangle containing an unknown compound angle and for transferring the other sides of the first two triangles to be the sides of the third triangle set on the computer and means for reading the unknown compound angle from the computer with the third triangle set on the computer.

Another object is to provide a mechanical computer as set forth above including means for registering a reference length for future use during compounding of an angle.

Another object is to provide a mechanical computer for compounding an angle or the like, including a slide having a circular segment angle degree scale on one end thereof, a beam secured to, extending transversely of and movable vertically with respect to the slide, means for locking the beam in a selected position on the slide, a coupler bar pivotally mounted at one end of the slide at the center of the degree scale, a coupler mounted on the beam for movement therealong transversely of the slide through which the coupler bar is telescoped, means for locking the coupler bar at a fixed length to the coupler while permitting relative rotation between the coupler and the beam and an adjustable stop at both ends of the beam for setting the limits of movement of the coupler.

Another object is to provide a mechanical computer as set forth above and further including a stop pin at the other end of the slide for limiting the movement of the beam.

Another object is to provide a mechanical computing device for compounding angles and the like which is simple in construction, economical to manufacture and efficient in use even by those unskilled in mathematics.

Other objects and features of the invention will become apparent as the description proceeds, especially when taken in conjunction with the accompanying drawings, illustrating a preferred embodiment of the invention, wherein.

Figure 1:
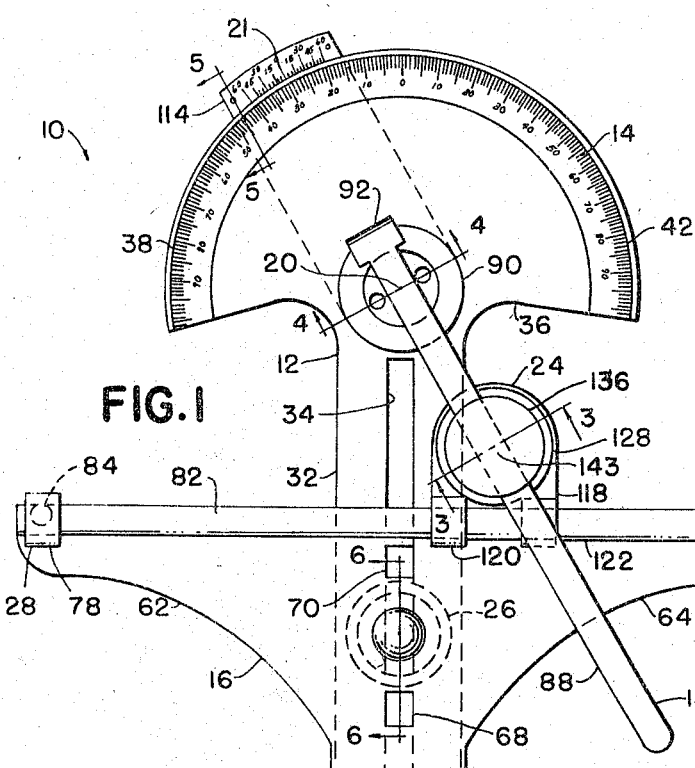
FIGURE 1 is a front view of a mechanical computing device constructed in accordance with the invention.

With particular reference to the figures of the drawings, one embodiment of the present invention will now be considered in detail.

The compound angle computing device 10, illustrated in FIGURES 1–7 of the drawings, includes the slide 12 having the circular segment angle degree scale 14 on the upper end thereof, the beam 16 extending transversely and perpendicular to the slide 12 and movable vertically therealong, the coupler bar 18 pivotally secured to the slide 12 at the central axis 20 of the circular degree scale, the vernier member 22 secured to the pivoted end of the coupler bar 18 for movement therewith and including vernier part 114 thereon, and coupler 24 positioned on the beam 16 for sliding movement relative thereto telescopically receiving the coupler bar 18 and including structure for locking the coupler bar to the coupler while permitting relative rotation therebetween. Beam locking structure 26 is provided operable between the beam and slide for locking the beam in a predetermined position on the slide. A left and right stop 28 and 30, respectively are also provided on the beam for establishing limiting positions of the coupler 24 on the beam 16.

In operation the mechanical computing device 10 may be used to compute an unknown compound angle in a first right triangle when the first right triangle has a different side in common with each of a second and third adjacent right triangles, each of which have their other side in common, and when one angle is known in each of the other triangles. In such operation the second and third known triangles are first set up on the computer with the coupler bar forming the hypotenuse of the triangles and the known angle of the triangles being indicated on the degree scale 14 of the slide by the appropriate calibration of the vernier scale 21 on vernier part 114. The sides of the second and third triangles forming sides of the first triangle having the unknown compound angle therein are recorded on the computer and the unknown triangle then set up on the computer. The unknown compound angle is then read from the degree scale.

More specifically the slide 12 includes an elongated portion 32 having the longitudinally extending slot 34 therein. The circular sector portion 36 of the slide 12 includes the degree scale 14 thereon which, as best shown in FIGURE 1, includes a left quadrant 38 including angular degrees from zero to one hundred degrees plotted about the axis 20 and a right quadrant 42 again including angular degrees plotted about the axis 20 from zero to one hundred degrees.

Abutment structure 44 is provided at the other end of the elongated portion 32 of the slide 12 from the circular sector 36. The abutment structure 44 includes a housing 46 having a stepped opening 48 extending therethrough, a stop pin 50 positioned within the opening 48 having an end 52 extending outwardly through the housing 46 and an end 54 extending into and adapted to extend through an opening 56 in the slide 12 and a central radially enlarged portion 58 positioned within the opening 48. The pin 50 is urged in a direction to tend to withdraw the pin from the opening 56 in slide 12 by means of the spring 60.

Figure 2:
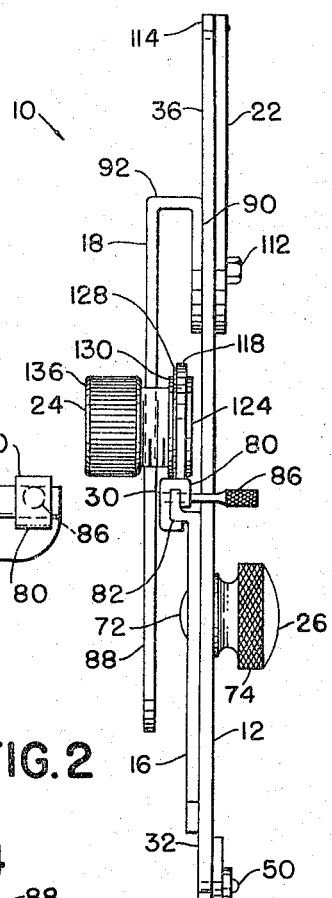
FIGURE 2 is a side view of the device illustrated in FIGURE 1.
Figure 3:
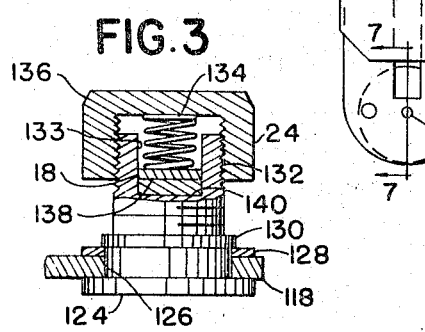
FIGURE 3 is a partial section view of the device illustrated in FIGURE 1 taken substantially on the line 3—3 in FIGURE 1.
Figure 4:
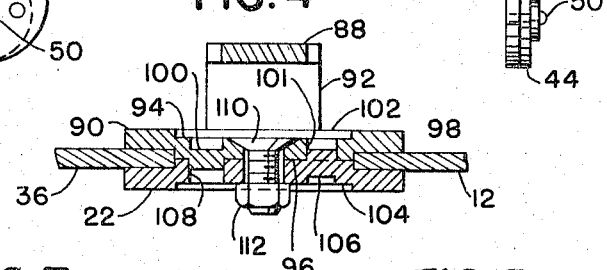
FIGURE 4 is a partial section view of the device illustrated in FIGURE 1 taken substantially on the line 4—4 in FIGURE 1.

Beam 16 is shaped, as shown best in FIGURES 1 and 2, and includes a left beam portion 62 and a right beam portion 64 depending from a central portion 66 extending along the elongated portion 32 of the slide 12. The central portion 66 of beam 16 is provided with a pair of offset guide portions 68 and 70 which extend into the slot 34 in the slide 12 for guiding the beam 16 in vertical movement along the slide, as shown best in FIGURE 6.

Figures 6, 7:
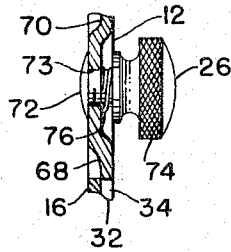
FIGURE 6 is a partial section view of the device illustrated in FIGURE 1 taken substantially on the line 6—6 in FIGURE 1.
FIGURE 7 is a partial section view of the device illustrated in FIGURE 1 taken substantially on the line 7—7 in FIGURE 1.

The beam 16 may be locked in an adjusted position along the slide 12 by means of the beam locking structure 26. The beam locking structure 26, as best shown in FIGURE 6, includes the headed and threaded pin 72 extending through the opening 73 in the beam 16 and the slot 34 in the slide 12 and the beam lock screw 74 threaded onto the pin 72. A spring 76 is provided operable between the beam 16 and screw 74 to hold the slide 12 and beam 16 in alignment during adjustment thereof.

The left and right stops 28 and 30 on the beam 16 each include a generally U-shaped abutment member 78 and 80, respectively, positioned for sliding movement along the left and right portions of the beam 16 on a longitudinally extending offset upper portion 82 of the beam 16. The abutment members 78 and 80 may be locked in an adjusted position by lock screws 84 and 86 extending through the abutment members 78 and 80, respectively, as shown best in FIGURE 2.

The coupler bar 18 includes an elongated portion 88 connected to and in spaced relation from a disc portion 90 by a perpendicularly extending transitional portion 92. As shown best in FIGURE 4, the disc portion 90 of the coupler bar 18 is pivotally secured to the slide 12 on axis 20 in conjunction with the vernier member 22.

Thus, the disc portion 90 of the coupler bar 18 includes an offset concentric inner circular portion 94, the upset side 96 of which extends within the opening 98 in the slide 12 at the center of the circular sector portion 36 thereof for half the thickness of the slide. A further depressed portion 100 is provided in the circular disc portion 90 diametrically opposed to an opening 101 in the disc portion 90.

The vernier member 22 is provided with a similar circular depressed portion 104 having a diametrically opposed further depressed portion 106 and opening 108. Thus with the vernier member 22 positioned within the opening 98 in the slide 12 and with the portion 100 of the coupler bar within the opening 108 in the vernier member and the portion 106 of the vernier member in the opening 101 in the coupler bar, the vernier member 22 forms an extension of the coupler bar 18. The screw 110 and nut 112 are provided to hold the coupler bar 18 and vernier member 22 in assembly with the slide 12 while permitting relative rotation of the rigidly connected coupler bar and vernier member with respect to the slide.

Figure 5:
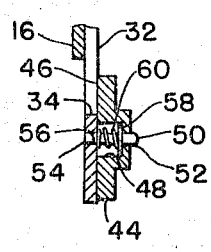
FIGURE 5 is a partial section view of the device illustrated in FIGURE 1 taken substantially on the line 5—5 in FIGURE 1.

An arcuate vernier scale part 114 having vernier scale 21 thereon is secured to the vernier member 22 by convenient means, such as screw 114, and is used in conjunction with the degree scale 42 to provide an accurate reading in degrees and minutes of the angular position of the coupler bar 16 with respect to the slide 12, as best shown in FIGURES 1 and 5.

The coupler 24 includes the vertically extending member 118 secured to the offset portion 82 of the beam 16 by offset portions 120 and 122 thereof for movement longitudinally of the offset portion 82 of the beam 16. The coupler 24 further includes the headed bolt 124 passing through the opening 126 in the member 118 and pivotally secured thereto by means of the washer 128 and snap ring 130. The threaded upper end 132 of bolt 124 is provided with a transverse slot 140 for receiving the spring 134 acting between the coupler lock screw 136 threaded onto the nut 124 and the shim 138 positioned in the slot 140. Shim 138 rests on the coupler bar 18 extending through slot 140 in the bolt 124.

Thus, it will be seen that with the mechanical computing structure 10 as thus described a plurality of different right triangles may be formed having the length of the coupler bar between the axis 20 of the pivotal mounting for the coupler bar and the axis 143 at the center of the pivotal mounting of the bolt 124 of the coupler structure as the hypotenuse, the projected distance on the beam 16 between these two axes as the opposite side and the projected distance between these two axes on the slide 12 as the adjacent side of the angle indicated on the scales 14 and 21.

With such structure it will be readily apparent that if one side of a triangle formed thereby, for example, the side formed by the slide 12 is given a unity value, then the other two sides are the trigonometric functions of the angle indicated on the scales. Thus, the side formed by the beam would be the tangent function of the angle set on the scales, while the hypotenuse formed by the coupler bar would be the secant of the angle indicated on the scales. Similarly if the side formed by the beam is chosen to be equal to unity, the side formed by the slide is equal to the cotangent of the angle indicated, while the hypotenuse is equal to the cosecant function of the angle. Also, if the hypotenuse is chosen as unity, the slide side will be the cosine function of the angle and the beam side will be the sine function of the angle in accordance with the basic trigonometry definitions of these functions of the angle.

Figure 8:
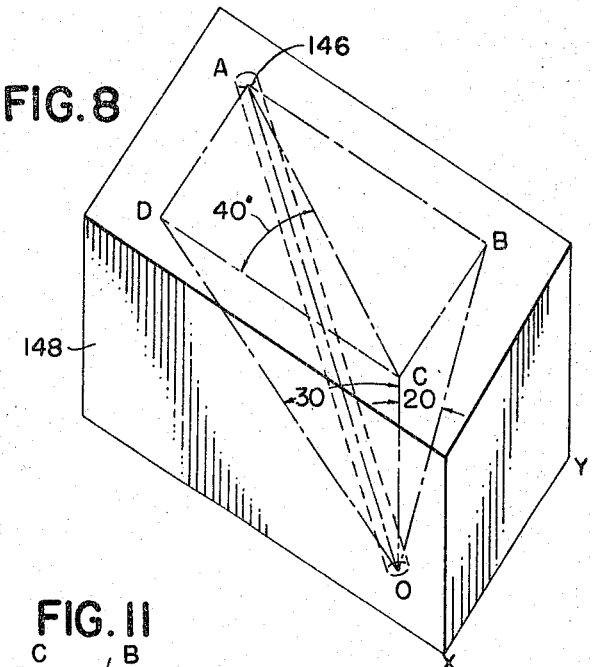
FIGURE 8 is a perspective view of a workpiece in which a hole is to be drilled at a compound angle.
Figure 9:
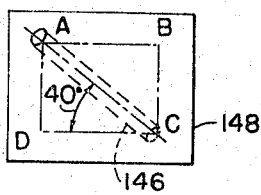
FIGURES 9, 10 and 11 illustrate the projection of the hole in the workpiece illustrated in FIGURE 8 on the top, front and side of the workpiece, respectively.
Figure 10:
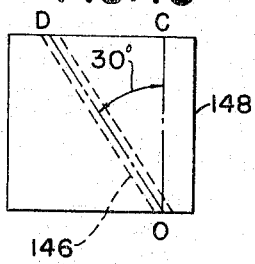
Figure 11:
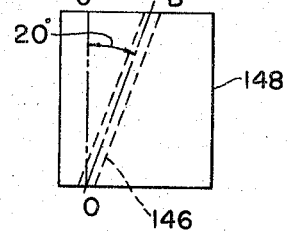

The operation of the mechanical computer device 10 will be considered in conjunction with the FIGURES 8–13. In FIGURE 8 a workpiece 148 is illustrated in which it is desired to drill a hole 146 at an angle oblique to both the vertical and horizontal plane of the workpiece. The projections of the hole 146 on the top view, front view and side view of the workpiece 148 are illustrated in FIGURES 9, 10 and 11 wherein the known angles which will be provided on working drawings of the workpiece 148 in which it is desired to drill the hole 146 are indicated.

As indicated above, if the workpiece is to be positioned by the rotation and tilt method with the top and front view illustrated in FIGURES 9 and 10 only given, the workpiece is first rotated through the angle DCA, after which it must be tilted through the compound angle COA to be determined. The angle COA may be determined through trigonometric calculations.

Figure 12:
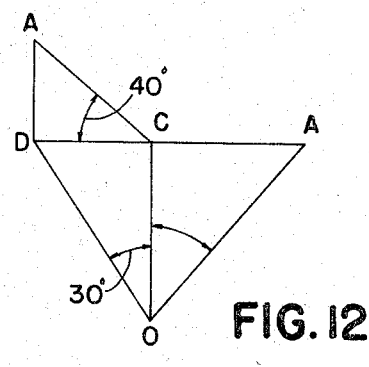
FIGURES 12 and 13 are diagrams representing the three triangles which it is necessary to form on the mechanical computing device illustrated in FIGURES 1–7 in computing the required compound angle for drilling the hole in the workpiece illustrated in FIGURE 8 with the workpiece mounted by either of the two usual mounting methods.

Thus, in FIGURE 12 if the side DC of the right triangle ACD is set equal to unity, it will be seen that the side CA is then equal to the secant of forty degrees. Similarly, with the side DC of right triangle DCO equal to unity, the side OC of the triangle will be the cotangent of thirty degrees. Then, since the side CA and the side OC both appear in the right triangle whose angles are unknown, from the usual trigonometric function formulas it will be seen that the compound angle COA is the angle whose tangent function is the secant of forty degrees divided by the cotangent of thirty degrees.

Since the secant of forty degrees is equal to the reciprocal of the cosine of forty degrees and the cosine of forty degrees is .76604 and since the cotangent of thirty degrees is equal to the reciprocal of the tangent of thirty degrees which is .57735, the unknown compound angle COA is the angle which has a tangent of .57735 divided by .76604 which is .75355. From tables of the trigonometric functions then, it can be seen that the compound angle COA will be equal to thirty-seven degrees.

Thus, as set forth above, it will be seen that the finding of the compound angle COA mathematically requires considerable facility with trigonometric functions and both mathematical tables and calculations and is therefore undesirable. The same compound angle COA may be determined through use of the compound angle computer of the invention in the following manner using no mathematical tables or calculations.

First, unloosen both the beam lock screw 74 and the coupler lock screw 136 along with both the left and right lock screws 84 and 86. Push the stop pin 52 so that it extends out through the front of slide 12 and move the beam 16 downward on the slide 12 until the beam contacts the stop pin 52. Tighten the beam lock screw 74. This registers the side OC of the triangle DCO so that it can be used later.

Move the coupler 24 to the left on the beam 16 until the vernier scale 21 registers the angle DOC or thirty degrees on the right quadrant 42 of the circular sector portion 36 of slide 12. Set the left stop 78 against the coupler 24 and tighten the lock screw 84. The value of DC which is chosen as unity since this side is common to both the triangles ACD and DCO is thus registered on the beam 16.

The value of AC must now be set since AC is the side common to the known triangle ACD and the unknown triangle AOC. Using the distance DC registered on the beam 16 as unity with the coupler 24 held against the left stop 78, the beam lock screw 74 is loosened and the beam 16 is moved up until the angle CAD registers on the right quadrant 42 of the degree scale 14 on the slide 12. The coupler bar 18 as the hypotenuse of the triangle CAD then is the side AC of triangles ACD and AOC and is registered on the coupler bar 18 by tightening the coupler lock screw 136.

Since both the sides OC and AC of the triangle COA have been set by the stop pin on the slide 12 and by the coupler 24 secured to the coupler bar 18, the compound angle COA may be found by forming the triangle COA on the computer 10.

First, however, it is necessary to transfer the side AC of triangle ACD which is registered on the computer bar 18 to the beam 16 on the right side so it can be used as the opposite side of the triangle COA. This is accomplished by rotating the coupler bar 18 to the right to raise both the coupler 24 and beam 16 until the coupler bar and beam are parallel. Stop 80 is then locked against the coupler 24 to register the side AC on the beam 16.

The coupler lock screw 136 is then loosened and the beam 16 is brought down to contact the pushed out stop pin 50 and the beam lock screw 74 is tightened. Thus, the side OC of the triangle COA is again registered on the slide. The coupler bar 18 is then rotated to position the coupler 24 against the stop 80 with the beam 16 held stationary. The compound angle COA may then be read from the left quadrant 38 of the angle scale 14 with the aid of the vernier scale 22.

Thus, the compound angle computer 10 may be used to determine compound angles without mathematical tables or computations from only the information normally provided on projected front and top views of the usual working drawings through transfer of portions of known triangles to form the triangle containing the compound angle.

Figure 13:
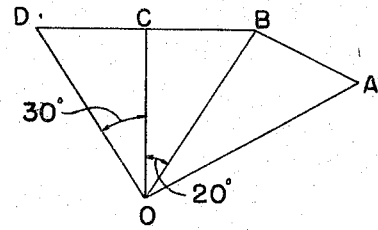

Similarly, with particular reference to FIGURE 13, mathematically the unknown angle BOA is equal to the angle whose tangent is the tangent of thirty degrees over the secant of twenty degrees so that the tangent of angle BOA is equal to .57735 times the cosine of twenty degrees which is .93969 or .54253. Angle AOB is thus equal to approximately twenty-eight degrees and thirty minutes.

The compound angle computer may also be used to find the compound angle BOA without mathematical tables or computations from the information given in the usual front and side views of the projected hole to be machined. Thus, when the front and top view of the angle BOA, for example, are given so that it is desired to mount the workpiece 148 by the double tilt method, the two known right triangles DOC and COB are selected along with the right triangle BOA containing the unknown angle BOA to establish the two known triangles having a common side OC which may be set equal to unity, each having one side in common with the triangle BOA. Thus, as shown in FIGURE 13, BO is common to triangles COB and BOA while by geometry since ABCD forms a rectangle having opposite parallel sides, as shown in FIGURE 8, so that CD is equal to AB and are the common sides to triangles DOC and BOA.

In determining the compound angle BOA the beam 16 will be positioned in the approximate center of the slide 12 and the beam lock screw 74 tightened to establish the side CO of triangles DOC and COB as unity. The coupler bar 18 is pivoted to the left to register the angle DOC on the degree scale in the right quadrant 42 of the circular sector portion 36 of slide 12. The stop 78 is then positioned against the coupler 24 and the lock screw 84 is tightened to register the side CD of triangle DOC which is equal to the side AB of triangle BOA.

The coupler bar 18 is then pivoted to the right until the angle COB is registered on the degree scale on the left quadrant 38 of the circular sector 36. The coupler lock screw 136 is then tightened to register the side BO of triangles COB and BOA on the coupler bar 18 and the beam lock screw 74 loosened.

With the side BO of the triangle BOA registered on the coupler bar 18, the coupler bar is moved to the left until zero is registered on the degree scale. The beam lock screw 74 is then tightened and the coupler lock screw 136 then loosened so that the side BO of the triangle BOA is now transferred to the slide 12. To read the compound angle BOA on the degree scale 14 it is then only necessary to move the coupler 24 to the previously positioned stop 78.

Should the given angles in the known triangles be greater than sixty degrees, the other acute angle of the triangle should be used instead of the angle greater than sixty degrees with appropriate modifications in the procedure outlined above.

Thus, it will be readily seen that if any three right triangles chosen include two triangles having a common side each of which has the other side equal to a different side of the third triangle and one acute angle of each of the two triangles is known any angle of the three triangles may be found without mathematical computations or tables. Further, while the computation of compound angles capable of being carried out by the computer 10 are useful in determining a compound angle at which a hole is to be drilled in a workpiece, the computing structure 10 is not limited thereto and, for example, is useful in determining a compound angle at which a plain surface is to be machined on a rectilinear workpiece.

While one embodiment of the present invention has been disclosed in detail, it will be understood that other embodiments and modifications thereof are contemplated by the inventor. It is the intention to include all embodiments and modifications as are defined by the appended claims within the scope of the invention.

What I claim as my invention is:

1. A mechanical computing device for determining an angle of a first right triangle when one angle of a second and third right triangle each of which have one side in common with a different side of the first right triangle and have their other sides in common is known comprising a slide, a beam extending transversely of the slide on both sides thereof and movable longitudinally of the slide, means for locking the beam to said slide in any position therealong, a coupler bar pivoted to said slide at one end thereof, means operable between the coupler bar and slide for indicating the angle between the coupler bar and slide and a coupler secured to the beam for movement longitudinally thereof without hinderance to positions on both sides of the slide including means for securing the coupler to the coupler bar at any position therealong while permitting relative rotation therebetween.

2. Structure as set forth in claim 1 and further including abutment means at the other end of said slide for determining a fixed position of the beam on the slide for future reference.

3. Structure as set forth in claim 2 wherein the abutment means comprises a housing having a stepped opening therethrough secured to the slide, a stop pin secured within the opening extending out of the housing on one side of the slide and adapted to extend through the other side of the slide and resilient means urging the stop pin out of the housing on the one side of the slide.

4. Structure as set forth in claim 1 and further including stop means selectively positionable along the beam for registering the position of the coupler on each end of the beam.

5. Structure as set forth in claim 4 wherein the beam is provided with a longitudinally extending offset portion and the stop means for registering the position of the coupler on the beam each comprises an abutment slidably mounted on the offset portion of the beam and a lock screw operable between the abutment and beam for securing the abutment to the beam in an adjusted position.

6. Structure as set forth in claim 1 wherein the slide is provided with a longitudinally extending slot therein and the beam is provided with offset portions extending into the slot for guiding the beam in movement longitudinally of the slide.

7. Structure as set forth in claim 6 wherein the means for locking the beam to the slide comprises a headed and threaded pin extending through the slot in the slide and the beam, a beam lock screw threaded on the end of the pin and resilient means operable between the beam lock screw and the beam.

8. Structure as set forth in claim 1 wherein the means for indicating the angle between the coupler bar and slide comprises a circular sector portion on the slide having a degree scale thereon concentric with the pivot mounting of the coupler bar and a vernier member secured to the coupler bar and rotatable therewith including a vernier scale operably associated with the degree scale on the slide.

9. Structure as set forth in claim 1 wherein the means for securing the coupler to the coupler bar includes a headed bolt extending through the coupler having a slot across the threaded end thereof receiving the coupler bar, a coupler lock screw threaded over the threaded end of the bolt, resilient means operable between the coupler lock screw and the coupler bar within the slot in the headed bolt and means for pivotally securing the headed bolt to the coupler.

10. A mechanical computing device for determining an angle of a first right triangle when one angle of a second and third right triangle each of which have one side in common with a different side of the first right triangle and have their other sides in common is known comprising a slide, a beam extending transversely of and movable longitudinally of the slide, means for locking the beam to said slide in any position therealong, a coupler bar pivoted to said slide at one end thereof, means operable between the coupler bar and slide for indicating the angle between the coupler bar and slide, a coupler secured to the beam for movement longitudinally thereof including means for securing the coupler to the coupler bar at any position therealong while permitting relative rotation therebetween and abutment means at the other end of said slide for determining a fixed position of the beam on the slide for future reference, comprising a housing having a stepped opening therethrough secured to the slide, a stop pin secured within the opening extending out of the housing on one side of the slide and adapted to extend through the other side of the slide and resilient means urging the stop pin out of the housing on the one side of the slide.

11. A mechanical computing device for determining an angle of a first right triangle when one angle of a second and third right triangle each of which have one side in common with a different side of the first right triangle and have their other sides in common is known comprising a slide, a beam extending transversely of and movable longitudinally of the slide having a longitudinally extending offset portion, means for locking the beam to said slide in any position therealong, a coupler bar pivoted to said slide at one end thereof, means operable between the coupler bar and slide for indicating the angle between the coupler bar and slide, a coupler secured to the beam for movement longitudinally thereof including means for securing the coupler to the coupler bar at any position therealong while permitting relative rotation therebetween and stop means for registering the position of the coupler on the beam at each end of the beam, each comprising an abutment slidably mounted on the offset portion of the beam and a lock screw operable between the abutment and beam for securing the abutment to the beam in an adjusted position.

12. A mechanical computing device for determining an angle of a first right triangle when one angle of a second and third right triangle each of which have one side in common with a different side of the first right triangle and have their other sides in common is known comprising a slide having a longitudinally extending slot therein, a beam extending transversely of and movable longitudinally of the slide having offset portions extending into the slot in the slide for guiding the beam in movement longitudinally of the slide, means for locking the beam to the slide in any position therealong comprising a headed and threaded pin extending through the slot in the slide and the beam, a beam lock screw threaded on the end of the pin and resilient means operable between the beam lock screw and the beam, a coupler bar pivoted to said slide at one end thereof, means operable between the coupler bar and slide for indicating the angle between the coupler bar and slide and a coupler secured to the beam for movement longitudinally thereof including means for securing the coupler to the coupler bar at any position therealong while permitting relative rotation therebetween.

13. A mechanical computing device for determining an angle of a first right triangle when one angle of a second and third right triangle each of which have one side in common with a different side of the first right triangle and have their other sides in common is known comprising a slide, a beam extending transversely of and movable longitudinally of the slide, means for locking the beam to the slide in any position therealong comprising a headed and threaded pin extending through the slot in the slide and the beam, a beam lock screw threaded on the end of the pin and resilient means operable between the beam lock screw and the beam, a coupler bar pivoted to said slide at one end thereof, means operable between the coupler bar and slide for indicating the angle between the coupler bar and slide and a coupler secured to the beam for movement longitudinally thereof including means for securing the coupler to the coupler bar at any position therealong while permitting relative rotation therebetween.

14. A mechanical computing device for determining an angle of a first right triangle when one angle of a second and third right triangle each of which have one side in common with a different side of the first right triangle and have their other sides in common is known comprising a slide, a beam extending transversely of and movable longitudinally of the slide, means for locking the beam to said slide in any position therealong, a coupler bar pivoted to said slide at one end thereof, means operable between the coupler bar and slide for indicating the angle between the coupler bar and slide and a coupler secured to the beam for movement longitudinally thereof including means for securing the coupler to the coupler bar at any position therealong while permitting relative rotation therebetween comprising a headed bolt extending through the coupler having a slot across the threaded end thereof receiving the coupler bar, a coupler lock screw threaded over the threaded end of the bolt, resilient means operable between the coupler lock screw and the coupler bar within the slot in the headed bolt and means for pivotally securing the headed bolt to the coupler.

References Cited

UNITED STATES PATENTS

| | | | |
|---|---|---|---|
| 912,605 | 2/1909 | Osmonson | 33—97 |
| 2,517,264 | 8/1950 | Wake | 33—98 X |

FOREIGN PATENTS

| | | |
|---|---|---|
| 109,283 | 8/1917 | Great Britain. |

LEONARD FORMAN, *Primary Examiner.*

H. N. HAROIAN, *Assistant Examiner.*